United States Patent
Wu et al.

(10) Patent No.: US 9,398,541 B2
(45) Date of Patent: Jul. 19, 2016

(54) COMMUNICATION DEVICE FOR HANDLING UPLINK POWER CONTROL

(71) Applicant: HTC Corporation, Taoyuan (TW)

(72) Inventors: Chih-Yao Wu, Taoyuan (TW); Ling-San Meng, Taoyuan (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 0 days.

(21) Appl. No.: 14/687,920

(22) Filed: Apr. 16, 2015

(65) Prior Publication Data

US 2015/0304958 A1 Oct. 22, 2015

Related U.S. Application Data

(60) Provisional application No. 61/981,214, filed on Apr. 18, 2014.

(51) Int. Cl.
*H04W 52/16* (2009.01)
*H04W 52/14* (2009.01)
*H04W 52/24* (2009.01)
(Continued)

(52) U.S. Cl.
CPC ............ *H04W 52/146* (2013.01); *H04W 52/16* (2013.01); *H04W 52/246* (2013.01); *H04W 52/346* (2013.01); *H04W 52/367* (2013.01); *H04W 52/40* (2013.01); *H04W 52/50* (2013.01)

(58) Field of Classification Search
CPC . H04W 52/146; H04W 52/16; H04W 52/246; H04W 52/346; H04W 52/367; H04W 52/40; H04W 52/50

USPC .............. 455/69, 522, 515, 450, 13.4, 115.1, 455/177.1, 226.3; 370/311, 329, 252, 280, 370/278, 267, 260, 312, 328
See application file for complete search history.

(56) References Cited

U.S. PATENT DOCUMENTS 8,964,868 B2 * 2/2015 Shin ...................... H04W 52/42
370/311
9,166,719 B2 * 10/2015 Seo ...................... H04J 11/0056
(Continued)

FOREIGN PATENT DOCUMENTS

WO 2013036029 A1 3/2013
WO 2013115510 A1 8/2013

OTHER PUBLICATIONS

European Search report issued on Dec. 3, 2015 for EP application No. 15163972.1.
(Continued)

*Primary Examiner* — Tan H Trinh
(74) *Attorney, Agent, or Firm* — Winston Hsu; Scott Margo

(57) ABSTRACT

A communication device for handling uplink power control comprises the instructions comprise determining a power level of a first uplink (UL) subframe of a first base station and a first power level of a second UL subframe of a second base station according to an initial power level of the first UL subframe and an initial power level of the second UL subframe, wherein a starting boundary of the second UL subframe is within the first UL subframe; and determining a second power level of the second UL subframe of the second base station and a first power level of a third UL subframe of the first base station according to the first power level of the second UL subframe and an initial power level of the third UL subframe, wherein a starting boundary of the third UL subframe is within the second UL subframe.

4 Claims, 6 Drawing Sheets

(51) Int. Cl.
  *H04W 52/34* (2009.01)
  *H04W 52/36* (2009.01)
  *H04W 52/40* (2009.01)
  *H04W 52/50* (2009.01)

(56) References Cited

U.S. PATENT DOCUMENTS

| | | |
|---|---|---|
| 2011/0081936 A1 | 4/2011 | Haim |
| 2011/0275403 A1 | 11/2011 | Chen |
| 2013/0083730 A1 | 4/2013 | Gaal |
| 2013/0195048 A1 | 8/2013 | Ekpenyong |
| 2014/0056251 A1 | 2/2014 | Ahn |
| 2014/0133366 A1* | 5/2014 | Ribeiro ............... H04W 52/146 370/278 |
| 2014/0153534 A1 | 6/2014 | Kim |
| 2014/0226551 A1* | 8/2014 | Ouchi ................... H04W 52/04 370/311 |
| 2014/0247796 A1* | 9/2014 | Ouchi ................... H04L 5/0053 370/329 |
| 2014/0295909 A1* | 10/2014 | Ouchi ................. H04W 52/242 455/522 |
| 2014/0341089 A1* | 11/2014 | Ji .......................... H04L 5/0073 370/278 |
| 2015/0003272 A1* | 1/2015 | Hu ............................ H04L 5/14 370/252 |
| 2015/0036605 A1* | 2/2015 | Kim .................... H04W 52/146 370/329 |
| 2015/0181534 A1* | 6/2015 | Andersson ............ H04L 1/0015 370/311 |
| 2016/0007232 A1* | 1/2016 | Wang .................. H04B 7/0456 370/280 |

OTHER PUBLICATIONS

3GPP TS 36.213 V11.4.0 (Sep. 2013) Technical Specification 3rd Generation Partnership Project; Technical Specification Group Radio Access Network; Evolved Universal Terrestrial Radio Access (E-UTRA); Physical layer procedures (Release 11).

European Search report issued on Aug. 12, 2015 for EP application No. 15163972.1.

* cited by examiner

COMMUNICATION DEVICE FOR HANDLING UPLINK POWER CONTROL

CROSS REFERENCE TO RELATED APPLICATIONS

This application claims the benefit of U.S. Provisional Application No. 61/981,214, filed on Apr. 18, 2014 and incorporated herein by reference.

BACKGROUND OF THE INVENTION

1. Field of the Invention

The present invention relates to a communication device used in a wireless communication system, and more particularly, to a communication device handling uplink power control in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmission/reception, uplink multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

The UE may receive/transmit packets (e.g., transport blocks (TBs)) from/to two eNBs, when the UE is configured with a dual connectivity. Throughput of the UE is improved when the dual connectivity is operated. However, power levels for transmitting the packets to the eNBs may be scheduled (i.e., determined) by the corresponding eNBs independently. The eNB may not know the power level scheduled by the other eNB, and may schedule a power level for the UE such that the sum of the power levels is greater than the power level limit (i.e., maximum transmission power level) of the UE. The UE may not be able to transmit the packets according to the power levels, and the packets may be transmitted incompletely. Thus, UL power control becomes a difficult problem to be solved for the dual connectivity due to independent operations of the eNBs.

Furthermore, the UE may transmit the packets asynchronously to the eNBs. That is, the subframes for the eNBs may not align, and boundaries of the subframes for the eNB may locate within the subframes for the other eNB. The misalignment of the subframes may cause design of the UL power control even difficult, because the UL power control is usually performed based on a subframe basis. Thus, how to perform the UL power control when the dual connectivity is operated asynchronously is an important problem to be solved.

SUMMARY OF THE INVENTION

The present invention therefore provides a communication device for handling UL power control to solve the abovementioned problem.

A communication device for handling uplink power control configured to communicate with a first base station and a second base station comprises a storage unit for storing instructions, and a processing means coupled to the storage unit. The processing means is configured to execute the instructions stored in the storage unit. The instructions comprise determining a power level of a first uplink (UL) subframe of the first base station and a first power level of a second UL subframe of the second base station according to an initial power level of the first UL subframe and an initial power level of the second UL subframe, wherein a starting boundary of the second UL subframe is within the first UL subframe; performing a first UL transmission with the first base station in the first UL subframe according to the power level of the first UL subframe; determining a second power level of the second UL subframe of the second base station and a first power level of a third UL subframe of the first base station according to the first power level of the second UL subframe and an initial power level of the third UL subframe, wherein a starting boundary of the third UL subframe is within the second UL subframe; and performing a second UL transmission with the second base station in the second UL subframe according to the second power level of the second UL subframe.

A communication device for handling uplink power control configured to communicate with a first base station and a second base station comprises a storage unit for storing instructions and a processing means coupled to the storage unit. The processing means is configured to execute the instructions stored in the storage unit. The instructions comprise determining a control channel power level of the second base station according to a control channel power level of the first base station and a power level limit of the communication device; determining a first data channel power level of the first base station according to the control channel power level of the first base station, the control channel power level of the second base station and the power level limit; and determining a first data channel power level of the second base station according to the control channel power level of the first base station, the control channel power level of the second base station, the first data channel power level of the first base station and the power level limit.

A communication device for handling uplink power control configured to communicate with a first base station and a second base station comprises a storage unit for storing instructions and a processing means coupled to the storage unit. The processing means is configured to execute the instructions stored in the storage unit. The instructions comprise determining a first data channel power level of the first base station according to a control channel power level of the first base station and a power level limit of the communication device; and determining a second data channel power level of the first base station according to the first data channel power level of the first base station, the control channel power level of the first base station and the power level limit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
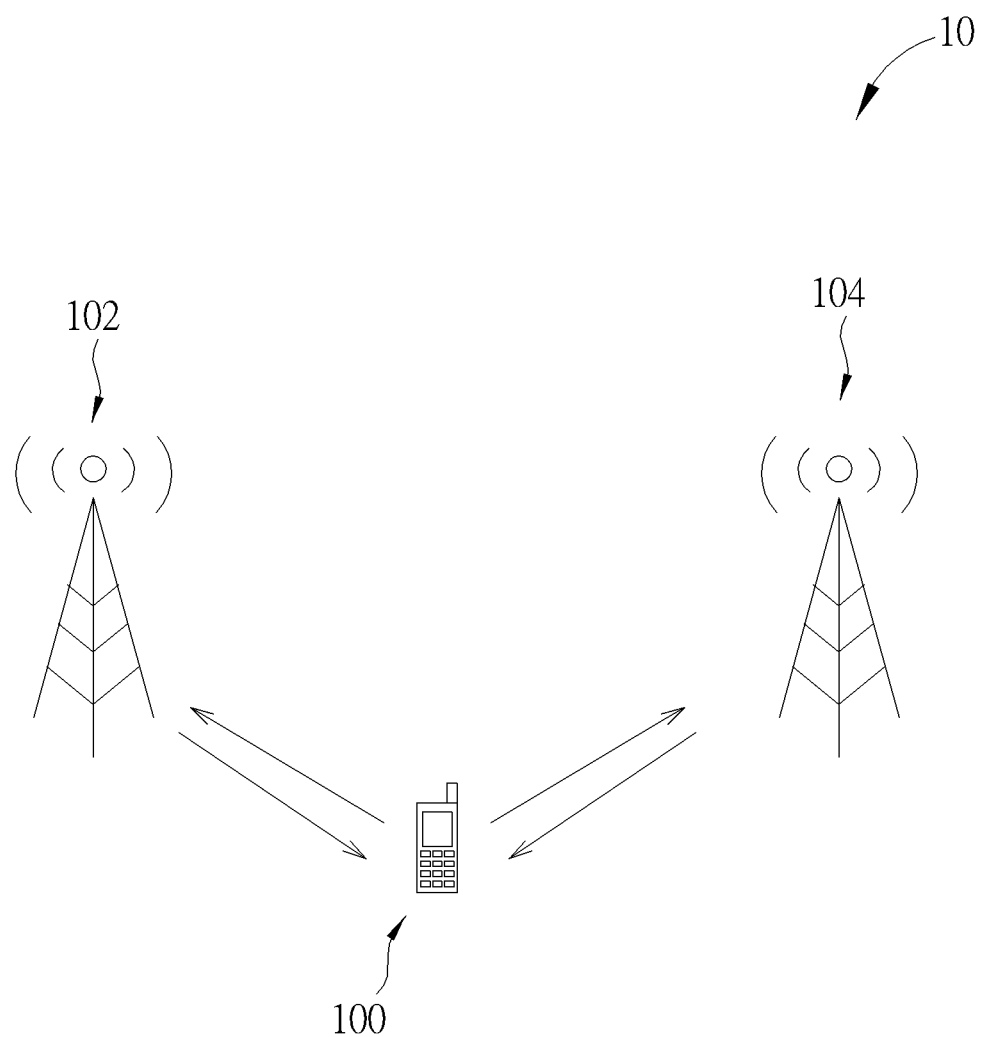
FIG. 1 is a schematic diagram of a wireless communication system according to an example of the present invention.

FIG. 1 is a schematic diagram of a wireless communication system 10 according to an example of the present invention. The wireless communication system 10 is briefly composed of a user equipment (UE) 100 and base stations (BSs) 102 and 104. In FIG. 1, the UE 100, the BSs 102 and 104 and are simply utilized for illustrating the structure of the wireless communication system 10. Practically, the BS 102 and/or the BS 104 may be an evolved NB (eNB) and/or a relay station in an evolved UTRAN (E-UTRAN), a long term evolution (LTE) system, a LTE-Advanced (LTE-A) system or an evolution of the LTE-A system. In FIG. 1, coverage areas of the BS 102 and the BS 104 may be partly overlapped.

As shown in FIG. 1, the UE 100 may be configured to communicate with the BS 102 and the BS 104 at the same time according to a dual connectivity configured to the UE 100. That is, the UE 100 may perform a transmission/reception via both the BSs 102 and 104. For example, the UE 100 may receive packets (e.g., transport blocks (TBs)) from the BSs 102 and 104 according to the dual connectivity, or the UE 100 may transmit packets (e.g., TBs) to the BSs 102 and 104 according to the dual connectivity. In general, it means that the UE 100 receives the packets from at least one cell of the BS 102 and at least one cell of the BS 104 according to the dual connectivity, when the UE 100 receives the packets from both the BSs 102 and 104. Similarly, it means that the UE 100 transmits the packets to at least one cell of the BS 102 and/or at least one cell of the BS 104 according to the dual connectivity, when the UE 100 transmits the packets to both the BSs 102 and 104. In addition, one of the BSs 102 and 104 may be a master eNB (MeNB) and the other BS be a secondary eNB (SeNB) according to the dual connectivity defined in 3GPP. One of the cell(s) of the MeNB communicating with the UE 100 may be a primary cell (PCell) and the other cell(s) (if available) of the MeNB may be secondary cell(s) (SCell(s)). One of the cell(s) of the SeNB communicating with the UE 100 may be a primary SCell (PSCell), and the other cell(s) (if available) of the SeNB may be SCell(s).

The UE 100 may be a low cost device (e.g., machine type communication (MTC) device), a device-to-device (D2D) device, a mobile phone, a laptop, a tablet computer, an electronic book, a portable computer system, or combination thereof. In addition, the UE 100, the BS 102 or the BS 104 may be seen as a transmitter or a receiver according to its transmission direction, e.g., for an uplink (UL), the UE 100 is the transmitter and the BS 102 and/or the BS 104 is the receiver, and for a downlink (DL), the BS 102 and/or the BS 104 is the transmitter and the UE 100 is the receiver.

Figure 2:
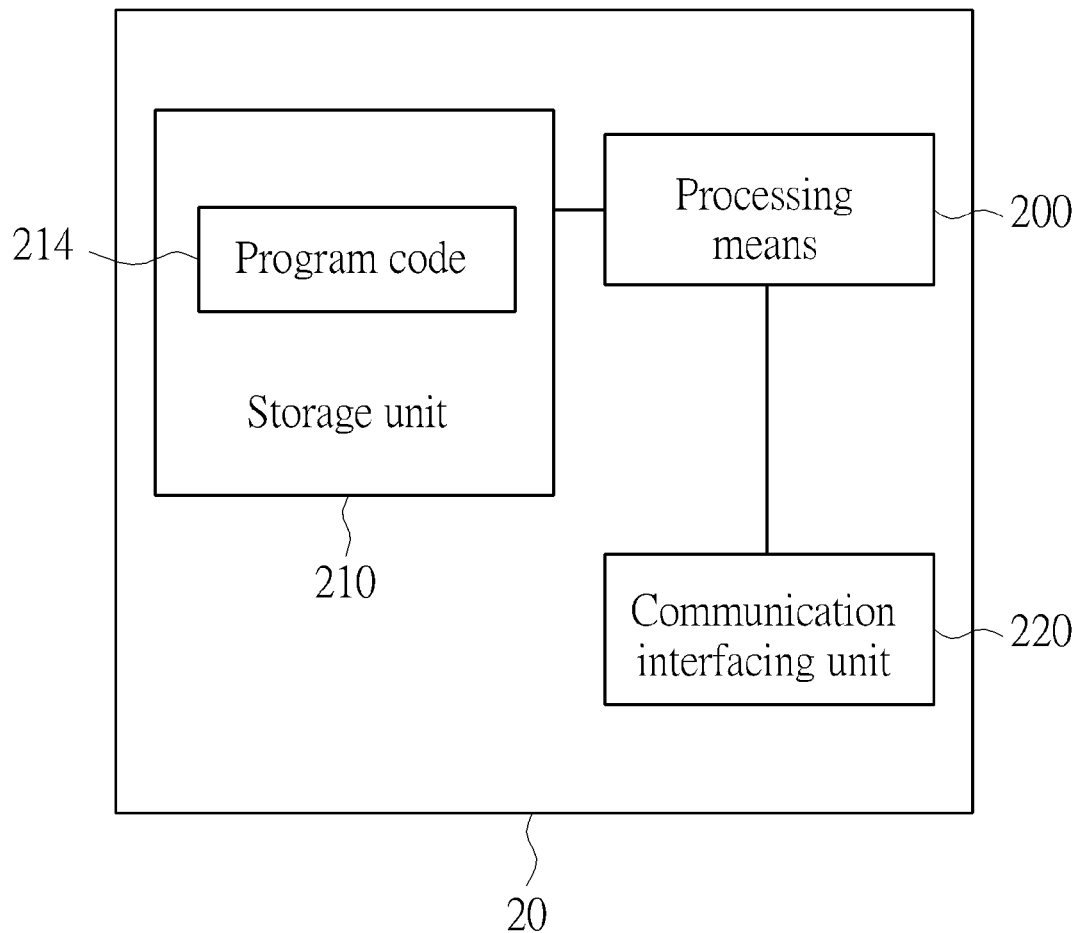
FIG. 2 is a schematic diagram of a communication device according to an example of the present invention.

FIG. 2 is a schematic diagram of a communication device 20 according to an example of the present invention. The communication device 20 may be the UE 100, the BS 102 and/or the BS 104 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200.

In the following description, for ease of illustration, the BS 102 and the BS 104 are assumed as the MeNB and the SeNB, respectively, without loss of generality.

Figure 3:
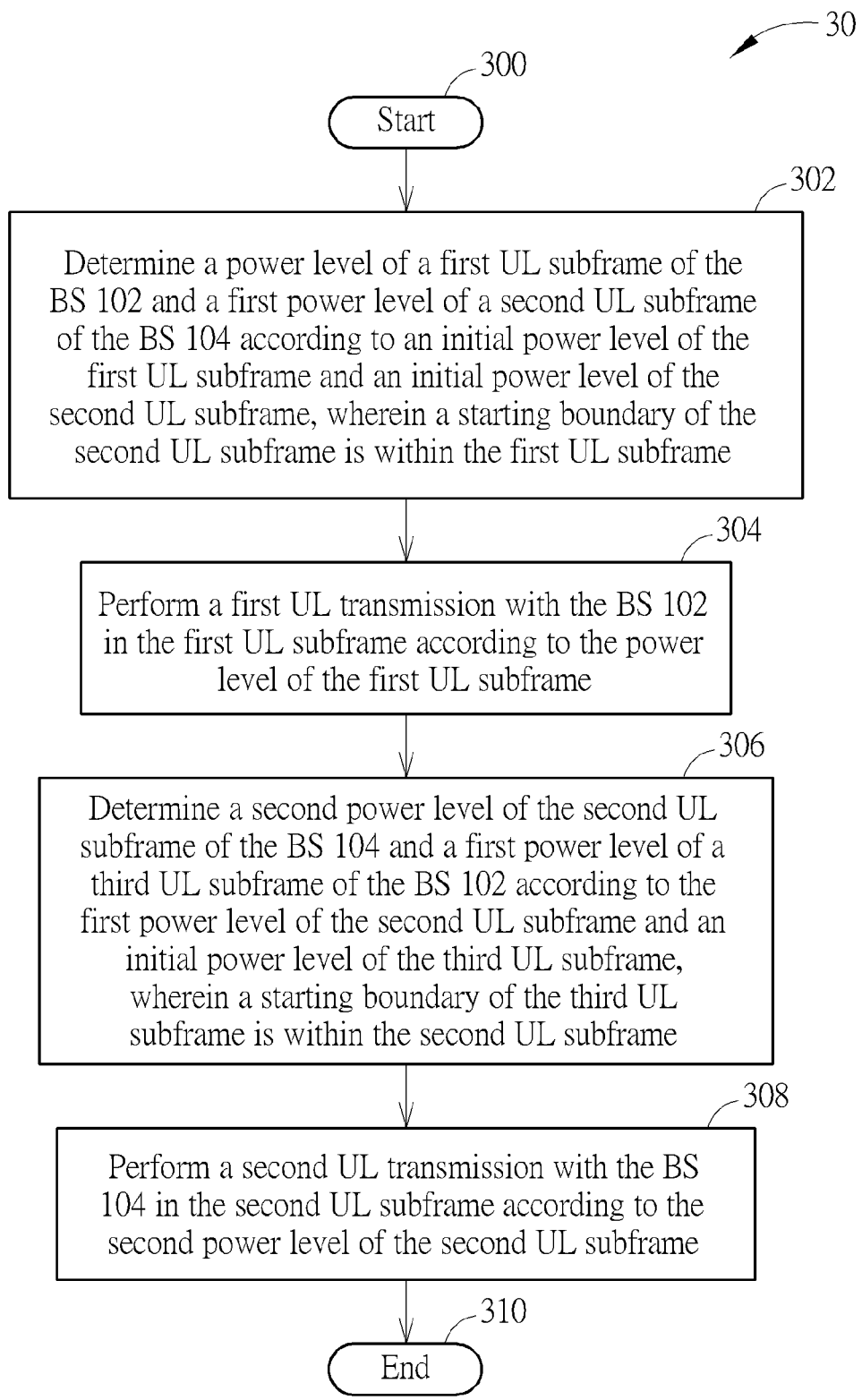
FIG. 3 is a flowchart of a process according to an example of the present invention.

FIG. 3 is a flowchart of a process 30 according to an example of the present invention. The process 30 can be termed as a double power scaling. The process 30 may be utilized in the UE 100 configured to communicate with the BS 102 and the BS 104, to handle UL power control for the BS 102 and the BS 104. The process 30 may be compiled into the program code 214 and includes the following steps:

Step 300: Start.

Step 302: Determine a power level of a first UL subframe of the BS 102 and a first power level of a second UL subframe of the BS 104 according to an initial power level of the first UL subframe and an initial power level of the second UL subframe, wherein a starting boundary of the second UL subframe is within the first UL subframe.

Step 304: Perform a first UL transmission with the BS 102 in the first UL subframe according to the power level of the first UL subframe.

Step 306: Determine a second power level of the second UL subframe of the BS 104 and a first power level of a third UL subframe of the BS 102 according to the first power level of the second UL subframe and an initial power level of the third UL subframe, wherein a starting boundary of the third UL subframe is within the second UL subframe.

Step 308: Perform a second UL transmission with the BS 104 in the second UL subframe according to the second power level of the second UL subframe.

Step 310: End.

According to the process 30, a power level of a first UL subframe of the BS 102 and a first power level of a second UL subframe of the BS 104 are determined according to an initial power level of the first UL subframe and an initial power level of the second UL subframe, wherein a starting boundary of the second UL subframe is within the first UL subframe.

The UE 100 may perform a first UL transmission with the BS 102 in the first UL subframe according to the power level of the first UL subframe.

Then, a second power level of the second UL subframe of the BS 104 and a first power level of a third UL subframe of the BS 102 are determined according to the first power level of the second UL subframe and an initial power level of the third UL subframe, wherein a starting boundary of the third UL subframe is within the second UL subframe. The UE 100 may perform a second UL transmission with the BS 104 in the second UL subframe according to the second power level of the second UL subframe. That is, a transmission power level of a UL subframe is used for transmitting a UL transmission in the UL subframe, after the transmission power level is computed twice, i.e., iteratively. Note that the first UL subframe of the BS 102 for performing the process 30 is treated as an initial subframe for starting the process 30 and may only be computed once. In addition, a UL power control mechanism (e.g., designed for a synchronous operation) for determined the power levels (i.e., steps 302 and 306) in the process 30 is not limited. That is, the process 30 can be realized with various UL power control mechanisms. Thus, UL power control for the asynchronous operation of the dual connectively can be solved according to the above description.

Realization of the present invention is not limited to the above description.

Figure 4:
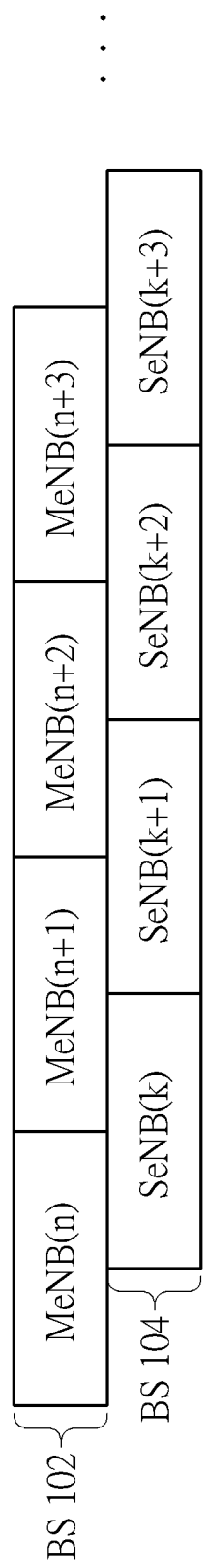
FIG. 4 is a schematic diagram of subframe arrangement of the BSs according to an example of the present invention.

FIG. 4 is a schematic diagram of subframe arrangement of the BSs according to an example of the present invention. Subframes of the BS 102 are denoted as MeNB(n)-MeNB(n+3), and subframes of the BS 104 are denoted as SeNB(k)-SeNB(k+3). As shown in FIG. 4, the subframes of the BS 102 and the BS 104 are not aligned, i.e., asynchronous in the time domain. Boundaries of the subframes of the BS 104 locate within the subframes of the BS 102. According to the process 30, a power level of the subframe MeNB(n) and a first power level of the subframe SeNB(k) are determined according to an initial power level of the subframe MeNB(n) and an initial power level of the subframe SeNB(k). The UE 100 may perform a UL transmission with the BS 102 in the subframe MeNB(n) according to the power level of the subframe MeNB (n). Then, a second power level of the subframe SeNB (k) and a first power level of the subframe MeNB(n+1) are determined according to the first power level of the subframe SeNB(k) and an initial power level of the subframe MeNB (n+1). The UE 100 may perform a UL transmission with the BS 104 in the subframe SeNB(k) according to the second power level of the subframe SeNB(k).

The above description can be continued for the following subframes. For example, a second power level of the subframe MeNB(n+1) and a first power level of the subframe SeNB(k+1) are determined according to the first power level of the subframe MeNB(n+1) and an initial power level of the subframe SeNB(k+1). The UE 100 may perform a UL transmission with the BS 102 in the subframe MeNB(n+1) according to the second power level of the subframe MeNB(n+1). It should be noted that in the above example, the subframe MeNB(n) and the subframe MeNB(n+1) are consecutive subframes, and the subframe SeNB(k) and the subframe SeNB (k+1) are consecutive subframes. However, this is not a restriction for realizing the process 30, and the subframes for performing the UL power control according to the process 30 can be selected subframes (e.g., nonconsecutive subframes). For example, the selected subframes may be determined by the UE, the BS 102, the BS 104 and/or a predetermined rule. In addition, as stated previously, the power levels of the subframes can be determined according to any UL power control design for the synchronous operation.

Figure 5:
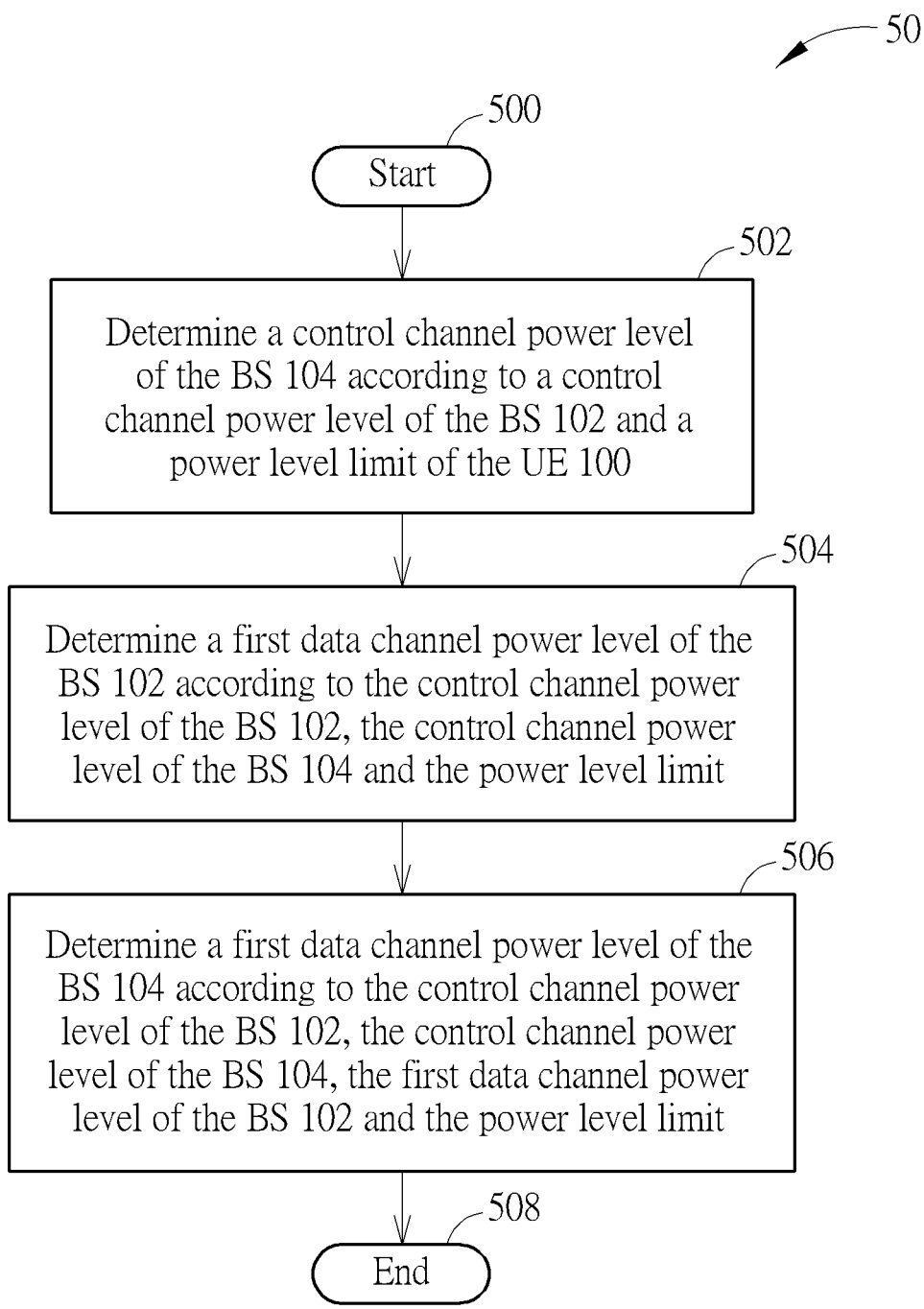
FIG. 5 is a flowchart of a process according to an example of the present invention.

FIG. 5 is a flowchart of a process 50 according to an example of the present invention. The process 50 may be utilized in the UE 100 configured to communicate with the BS 102 and the BS 104, to handle UL power control for the BS 102 and the BS 104. The process 50 may be compiled into the program code 214 and includes the following steps:

Step 500: Start.

Step 502: Determine a control channel power level of the BS 104 according to a control channel power level of the BS 102 and a power level limit of the UE 100.

Step 504: Determine a first data channel power level of the BS 102 according to the control channel power level of the BS 102, the control channel power level of the BS 104 and the power level limit.

Step 506: Determine a first data channel power level of the BS 104 according to the control channel power level of the BS 102, the control channel power level of the BS 104, the first data channel power level of the BS 102 and the power level limit.

Step 508: End.

According to the process 50, a control channel power level of the BS 104 is determined according to a control channel power level of the BS 102 and a power level limit (e.g., maximum transmission power level) of the UE 100. A first data channel power level of the BS 102 is determined according to the control channel power level of the BS 102, the control channel power level of the BS 104 and the power level limit. Then, a first data channel power level of the BS 104 according to the control channel power level of the BS 102, the control channel power level of the BS 104, the first data channel power level of the BS 102 and the power level limit. In other words, the priorities of the power levels from high to low are the control channel power level of the BS 102, the control channel power level of the BS 104, the first data channel power level of the BS 102, and the first data channel power level of the BS 104. Preferably, the sum of the power levels is not greater than the power level limit. Thus, the abovementioned problem of the UL power control for the dual connectivity is solved according to the process 50.

Realization of the present invention is not limited to the above description.

In one example, after the process 50 is performed, a second data channel power level of the BS 102 may be further determined according to the control channel power level of the BS 102, the control channel power level of the BS 104, the first data channel power level of the BS 102, the first data channel power level of the BS 104 and the power level limit, and a second data channel power level of the BS 104 may be further determined according to the control channel power level of the BS 102, the control channel power level of the BS 104, the first data channel power level of the BS 102, the first data channel power level of the BS 104, the second data channel power level of the BS 102 and the power level limit. In other words, the priorities of the second data channel power level of the BS 102 and the second data channel power level of the BS 104 are not greater than the priorities of the power levels mentioned in the process 50, wherein the priority of the second data channel power level of the BS 102 is not lower than the priority of the second data channel power level of the BS 104.

In addition, a sum of the control channel power level of the BS 102, the control channel power level of the BS 104, the first data channel power level of the BS 102, the first data channel power level of the BS 104, the second data channel power level of the BS 102 and the second data channel power level of the BS 104 (i.e., the abovementioned power levels) is not greater than the power level limit, for the transmissions to be performed completely. For example, the second data channel power level of the BS 102 and the second data channel power level of the BS 104 may be reduced (e.g., via using various weights) for the sum to be not greater than the power level limit. That is, the power levels with lower priorities are reduced such that the sum of the power levels is not greater than the power level limit. Further, a first weight and a second weight may be determined (and used) to reduce the second data channel power level of the BS 102 and for the second data channel power level of the BS 104, respectively, for the sum to be not greater than the power level limit.

Detail of the control channel power levels and the data channel power levels mentioned above are not limited. For example, the control channel power level may include (or simply be) a power level of a physical UL control channel (PUCCH). In one example, the first data channel power level may include (or simply be) a power level of a physical uplink (UL) shared channel (PUSCH) comprising UL control information. In one example, the second data channel power level may include at least one power level of at least one PUSCH without UL control information. That is, a priority of the channel with the UL control information is not lower than a priority of the channel without the UL control information.

In the following example, without loss of generality, the control channel power level, the first data channel power level, the second data channel power level are assumed as the power level of the PUCCH, the power level of the PUSCH including the UL control information and the at least one power level of the at least one PUSCH without the UL control information, respectively. According to the process 50 and the above description, the power levels can be determined according to the following equations:

$$P_{PUCCH\_SeNB}(i) = \min\{P_{PUCCH\_SeNB}(i)(P_{MAX}(i) - P_{PUCCH\_MeNB}(i))\}, \quad \text{(Eq. 1)}$$

$$P_{PUSCH\_MeNB,j}(i) = \min\{P_{PUSCH\_MeNB,j}(i)(P_{MAX}(i) - P_{PUCCH\_MeNB}(i) - P_{PUCCH\_SeNB}(i))\}, \quad \text{(Eq. 2)}$$

$$P_{PUSCH\_SeNB,j}(i) = \min\{P_{PUSCH\_SeNB,j}(i)(P_{MAX}(i) - P_{PUCCH\_MeNB}(i) - P_{PUCCH\_SeNB}(i) - P_{PUSCH\_MeNB,j}(i))\}, \quad \text{(Eq. 3)}$$

where $P_{PUCCH\_MeNB}(i)$, $P_{PUCCH\_SeNB}(i)$, $P_{PUSCH\_MeNB,j}(i)$, $P_{PUSCH\_SeNB,j}(i)$ and $P_{MAX}(i)$ are the power level of the PUCCH of the BS 102 (assumed as the MeNB), the power level of the PUCCH of the BS 104 (assumed as the SeNB), the power level of the PUSCH (including the UL control information) of the BS 102, the power level of the PUSCH (including the UL control information) of the BS 104 and the power level limit, respectively. The index i is the subframe index. The operation of min{A, B} returns the minimum of A and B. As can be seen, the priorities of the power levels described according to the process 50 are realized according to the equations (Eq.1), (Eq.2) and (Eq.3).

In addition, for the sum of the power levels to be not greater than the power level limit, the following equations can be used for reducing the power levels with lower priorities:

$$\Sigma_{c\sim j} w_{MeNB}(i) P_{PUSCH\_MeNB,c}(i) + \Sigma_{c\sim j} w_{SeNB}(i)$$
$$P_{PUSCH\_SeNB,c}(i) \leq P_{MAX}(i) - P_{PUCCH\_MeNB}(i) - P_{PUCCH\_SeNB}(i) - P_{PUSCH\_MeNB,j}(i) - P_{PUSCH\_SeNB,j}(i), \quad \text{(Eq.4)}$$

where $w_{MeNB}(i)$, $w_{SeNB}(i)$, $P_{PUSCH\_MeNB,c}(i)$ and $P_{PUSCH\_SeNB,c}(i)$ are a weight for the BS 102, a weight for the BS 104, the power level of the PUSCH (without the UL control information) of the BS 102 and the power level of the PUSCH (without the UL control information) of the BS 104, respectively. Thus, according to the above equations, not only the priorities of the power levels are realized but the power level limit is satisfied. As a result, the abovementioned problem of the UL power control for the dual connectivity is solved.

Figure 6:
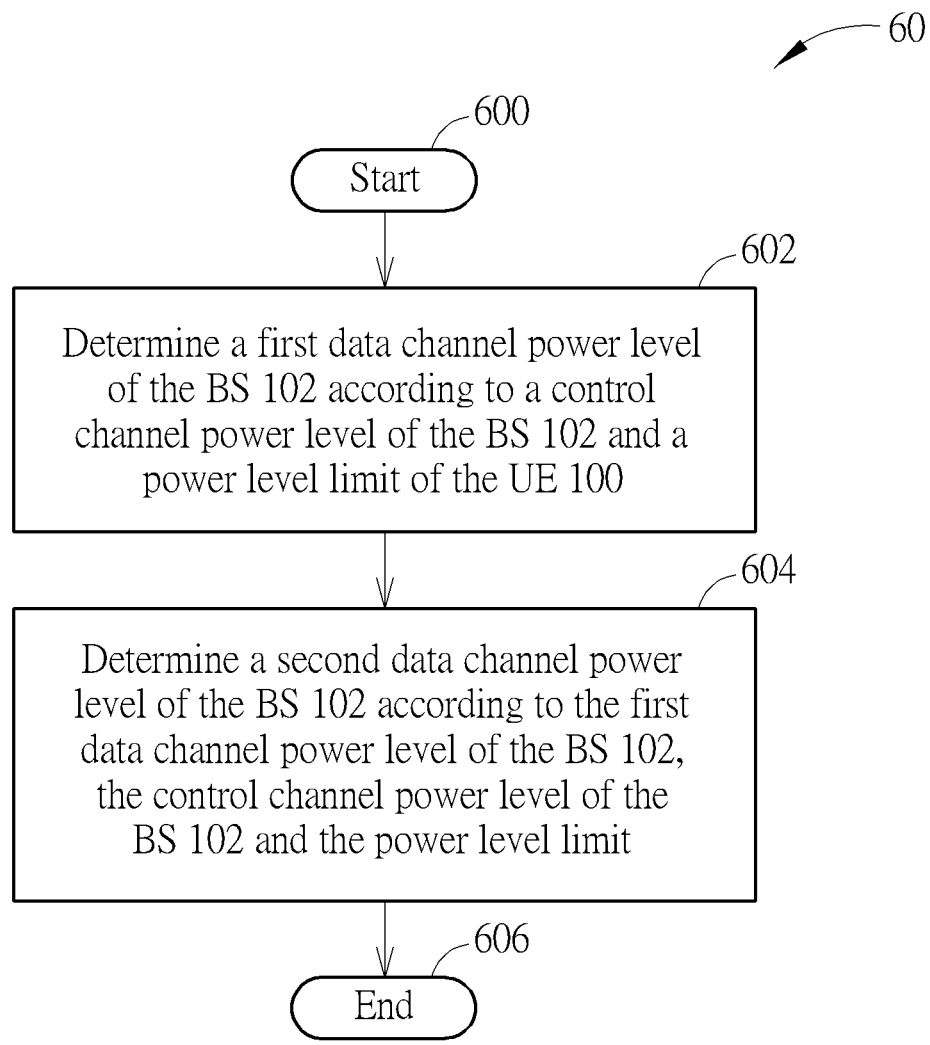
FIG. 6 is a flowchart of a process according to an example of the present invention.

FIG. 6 is a flowchart of a process 60 according to an example of the present invention. The process 60 may be utilized in the UE 100 configured to communicate with the BS 102 and the BS 104, to handle UL power control for the BS 102 and the BS 104. The process 60 may be compiled into the program code 214 and includes the following steps:

Step 600: Start.

Step 602: Determine a first data channel power level of the BS 102 according to a control channel power level of the BS 102 and a power level limit of the UE 100.

Step 604: Determine a second data channel power level of the BS 102 according to the first data channel power level of the BS 102, the control channel power level of the BS 102 and the power level limit.

Step 606: End.

According to the process 60, a first data channel power level of the BS 102 is determined according to a control channel power level of the BS 102 and a power level limit of the UE 100. Then, a second data channel power level of the BS 102 according to the first data channel power level of the BS 102, the control channel power level of the BS 102 and the power level limit. In other words, the priorities of the power levels from high to low are the control channel power level of the BS 102, the first data channel power level of the BS 102, and the second data channel power level of the BS 102. Preferably, the sum of the power levels is not greater than the power level limit. Thus, the abovementioned problem of the UL power control for the dual connectivity is solved according to the process 60.

Realization of the present invention is not limited to the above description.

In one example, after the process 60 is performed, a control channel power level of the BS 104 may be determined according to the control channel power level of the BS 102, the first data channel power level of the BS 102, the second data channel power level of the BS 102 and the power level limit. A first data channel power level of the BS 104 may be determined according to the control channel power level of the BS 102, the control channel power level of the BS 104, the first data channel power level of the BS 102, the second data channel power level of the BS 102 and the power level limit. Then, a second data channel power level of the BS 104 may be determined according to the control channel power level of the BS 102, the control channel power level of the BS 104, the first data channel power level of the BS 102, the first data channel power level of the BS 104, the second data channel power level of the BS 102 and the power level limit. In other words, the priorities of the power levels of the BS 102 are not lower than the priorities of the BS 104.

In addition, a first sum of the control channel power level of the BS 102, the control channel power level of the BS 104, the first data channel power level of the BS 102, the first data channel power level of the BS 104, the second data channel power level of the BS 102 and the second data channel power level of the BS 104 (i.e., the abovementioned power levels) is not greater than the power level limit, for the transmissions to be performed completely. For example, the control channel power level of the BS 104, the first data channel power level of the BS 104, the second data channel power level of the BS 104 and the second data channel power level of the BS 104 may be reduced (e.g., via using various weights) for the first sum to be not greater than the power level limit. That is, the power levels with lower priorities are reduced such that the sum of the power levels is not greater than the power level limit. Further, a first weight may be determined to reduce the control channel power level of the BS 104, the first data channel power level of the BS 104, the second data channel power level of the BS 104 and the second data channel power level of the BS 102, for the first sum to be not greater than the power level limit.

A second sum of the control channel power level of the BS 104, the first data channel power level of the BS 104 and the second data channel power level of the BS 104 may be determined, when the first sum is not greater than the power level limit. That is, the second sum is a sum of the reduced power levels. Then, the first data channel power level of the BS 104 may be determined according to the control channel power level of the BS 104 and the second sum, and the second data channel power level of the BS 104 may be determined according to the first data channel power level of the BS 104, the control channel power level of the BS 104 and the second sum. Again, a second weight may be determined to reduce the second data channel power level of the BS 104, for a sum of the control channel power level of the BS 104, the first data channel power level of the BS 104 and the second data channel power level of the BS 104 to be not greater than the second sum.

Detail of the control channel power levels and the data channel power levels mentioned above are not limited. For example, the control channel power level may include (or simply be) a power level of a PUCCH. In one example, the first data channel power level may include (or simply be) a power level of a PUSCH comprising UL control information. In one example, the second data channel power level may include at least one power level of at least one PUSCH without UL control information. That is, a priority of the channel with the UL control information is not lower than a priority of the channel without the UL control information.

In the following example, without loss of generality, the control channel power level, the first data channel power level, the second data channel power level are assumed as the power level of the PUCCH, the power level of the PUSCH including the UL control information and the at least one power level of the at least one PUSCH without the UL control information, respectively. According to the process 60 and the above description, the power levels can be determined according to the following equations:

$$P_{PUSCH\_MeNB,j}(i) = \min\{P_{PUSCH\_MeNB,j}(i), (P_{MAX}(i) - P_{PUCCH\_MeNB}(i))\}, \quad (Eq.5)$$

where $P_{PUCCH\_MeNB}(i)$, $P_{PUSCH\_MeNB,j}(i)$ and $P_{MAX}(i)$ are the power level of the PUCCH of the BS 102 (assumed as the MeNB), the power level of the PUSCH (including the UL control information) of the BS 102 and the power level limit, respectively. The index i is the subframe index. The operation of min{A, B} returns the minimum of A and B. As can be seen, the priorities of the power levels described according to the process 60 are realized according to the equation (Eq.5).

In addition, for the sum of the power levels to be not greater than the power level limit, the following equations can be used for reducing the power levels with lower priorities:

$$\Sigma_{c \neq j} w_{outer}(i) P_{PUSCH\_MeNB,c}(i) + w_{outer}(i)(P_{PUCCH\_SeNB}(i) + P_{PUSCH\_SeNB,j}(i) + \Sigma_{c \neq j} P_{PUSCH\_SeNB,c}(i)) \leq P_{MAX}(i) - P_{PUCCH\_MeNB}(i) - P_{PUSCH\_MeNB,j}(i), \quad (Eq.6)$$

where $w_{outer}(i)$, $P_{PUSCH\_MeNB,c}(i)$, $P_{PUCCH\_SeNB}(i)$, $P_{PUSCH\_MeNB,j}(i)$ and $P_{PUSCH\_SeNB,c}(i)$ are the first weight described previously, the power level of the PUSCH (without the UL control information) of the BS 102, the power level of the PUCCH of the BS 104 (assumed as the SeNB), the power level of the PUSCH (including the UL control information) of the BS 104 and the power level of the PUSCH (without the UL control information) of the BS 104, respectively.

Furthermore, the equations (Eq.5) and (Eq.6) can be seen as an outer scaling process for determining the power levels, and the power level of the PUCCH of the BS 104, the power level of the PUSCH (including the UL control information) of the BS 104 and the power level of the PUSCH (without the UL control information) of the BS 104 may be further scaled according to an inner scaling process. A nominal maximum power level for the BS 104 is first described as follows:

$$P_{MAX\_SeNB}(i) = w_{outer}(i)(P_{PUCCH\_SeNB}(i) + P_{PUSCH\_SeNB,j}(i) + \Sigma_{c \neq j} P_{PUSCH\_SeNB,c}(i)). \quad (Eq.7)$$

where $P_{MAX\_SeNB}(i)$ is the nominal maximum power level for the BS 104. Then, the power levels of the BS 104 after performing the inner scaling process can be obtained as follows:

$$P_{PUSCH\_SeNB,j}(i) = \min\{P_{PUSCH\_SeNB,j}(i), (P_{MAX\_SeNB}(i) - P_{PUCCH\_SeNB}(i))\}, \quad (Eq.8)$$

$$\Sigma_{c \neq j} w_{inner}(i) P_{PUSCH\_SeNB,c}(i) \leq P_{MAX\_SeNB}(i) - P_{PUCCH\_SeNB}(i) - P_{PUSCH\_SeNB,j}(i), \quad (Eq.9)$$

where $w_{inner}(i)$ is the second weight described previously. Thus, according to the above equations (i.e., the outer scaling process and/or the inner scaling process), not only the priorities of the power levels are realized but the power level limit is satisfied. As a result, the UL power control for the dual connectivity is solved.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SIP), a computer on module (COM), and the communication device 20. Process 30 and process 40 may be combined together to solve the problems as described above.

To sum up, the present invention provides a method of handling UL power control for dual connectivity. Mechanisms for the UL power control for both synchronous/asynchronous operations are proposed. The mechanisms can be combined as a complete solution for the asynchronous operation. Alternatively, the solutions can be used independently, e.g., combined with other solutions. Thus, the UL power control for the dual connectivity is solved according to the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling uplink power control configured to communicate with a first base station and a second base station, comprising:
   a storage unit for storing instructions of:
   determining a power level of a first uplink (UL) subframe of the first base station and a first power level of a second UL subframe of the second base station according to an initial power level of the first UL subframe and an initial power level of the second UL subframe, wherein a starting boundary of the second UL subframe is within the first UL subframe;
   performing a first UL transmission with the first base station in the first UL subframe according to the power level of the first UL subframe;
   determining a second power level of the second UL subframe of the second base station and a first power level of a third UL subframe of the first base station according to the first power level of the second UL subframe and an initial power level of the third UL subframe, wherein a starting boundary of the third UL subframe is within the second UL subframe; and performing a second UL transmission with the second base station in the second UL subframe according to the second power level of the second UL subframe; and a processing means, coupled to the storage unit, configured to execute the instructions stored in the storage unit.

2. The communication device of claim 1, the instructions further comprise:

determining a second power level of the third UL subframe and a first power level of a fourth UL subframe of the second base station according to the first power level of the third UL subframe and an initial power level of the fourth UL subframe, wherein a starting boundary of the fourth UL subframe is within the third UL subframe; and performing a third UL transmission with the first base station in the third UL subframe according to the second power level of the third UL subframe.

3. The communication device of claim 1, wherein the first base station is a master base station, and the second base station is a secondary base station.

4. The communication device of claim 1, wherein the first UL subframe and the third UL subframe are consecutive UL subframes, and the second UL subframe and the fourth UL subframe are consecutive UL subframes.

* * * * *